United States Patent
Sorsby

(10) Patent No.: US 11,575,550 B2
(45) Date of Patent: Feb. 7, 2023

(54) SYSTEM AND METHOD FOR HIGH-ENTROPY GAUSSIAN MINIMUM SHIFT KEYING (HE-GMSK) MODULATION

(71) Applicant: Rockwell Collins, Inc., Cedar Rapids, IA (US)

(72) Inventor: William B. Sorsby, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/162,028

(22) Filed: Jan. 29, 2021

(65) Prior Publication Data

US 2022/0247607 A1    Aug. 4, 2022

(51) Int. Cl.
*H04L 27/20* (2006.01)
*H04L 27/26* (2006.01)
*H04L 27/00* (2006.01)

(52) U.S. Cl.
CPC ...... *H04L 27/2017* (2013.01); *H04L 27/0014* (2013.01); *H04L 27/2614* (2013.01); *H04L 27/2659* (2013.01); *H04L 2027/0048* (2013.01)

(58) Field of Classification Search
CPC ............ H04L 27/2017; H04L 27/0014; H04L 27/2614; H04L 27/2659; H04L 2027/0048
See application file for complete search history.

(56) References Cited

U.S. PATENT DOCUMENTS

| | | | |
|---|---|---|---|
| 4,516,087 A | 5/1985 | Bruene | |
| 5,822,362 A * | 10/1998 | Friedmann | .......... H04L 27/2028 375/135 |
| 6,420,940 B1 | 7/2002 | Minnis et al. | |
| 7,352,795 B2 | 4/2008 | Furman et al. | |
| 8,503,571 B2 | 8/2013 | Chappaz | |
| 8,804,868 B2 | 8/2014 | Laurent | |
| 9,712,346 B2 | 7/2017 | Baptiste et al. | |
| 10,797,920 B1 | 10/2020 | Chavez | |
| 2005/0215206 A1* | 9/2005 | Granstrom | ........... H04B 1/0483 455/102 |
| 2016/0072546 A1* | 3/2016 | Floch | .................... H04L 27/364 375/150 |

* cited by examiner

*Primary Examiner* — Janice N Tieu
(74) *Attorney, Agent, or Firm* — Suiter Swantz pc llo

(57) ABSTRACT

A system and method for generating a high entropy (HE) constant-envelope Gaussian minimum shift keying (GMSK) modulated signal with suppressed cyclostationary features is disclosed. In embodiments, the system includes a primary GMSK modulator for generating an initial GMSK signal based on a received data stream for transmission. The system includes a sequence of secondary GMSK modulators for generating a sequence secondary GMSK signals based on pseudorandom number sequences based on distinct chip rates. The initial GMSK signal is multiplied by the first secondary GMSK signal to generate an initial composite GMSK signal, which is sequentially multiplied by each subsequent secondary GMSK signal until a final composite GMSK signal is achieved, the final composite GMSK signal being a HE-GMSK constant-envelope signal with suppression of cyclic and cyclostationary features that might otherwise cause detection or interception of the signal.

12 Claims, 6 Drawing Sheets

SYSTEM AND METHOD FOR HIGH-ENTROPY GAUSSIAN MINIMUM SHIFT KEYING (HE-GMSK) MODULATION

BACKGROUND

Low probability of detection (LPD) communication schema are designed to undetectably send information from one point to another via radio frequency to an authorized receiver (e.g., wireless communication). In order to prevent interception or detection, various methods are known which utilize pseudo-random sequences. Other methods utilize the basic structure of the modulation scheme and have associated rates (e.g., symbol rate, chip rate, hop rate, or the like). These methods are cyclostationary in that the signal's statistics are periodic but the signal itself is not periodic. Unfortunately, cyclostationary signals exhibit features which can be utilized by unauthorized receivers and are therefore susceptible to detection via carrier frequency, symbol rate, or other cyclic features. Conventional modulation types such as Quadrature Phase Shift Keying (QPSK) and Binary Phase Shift Keying (BPSK) exhibit cyclic structure and are susceptible to adversarial detection and therefore have limited LPD utility.

SUMMARY

Embodiments of the inventive concepts disclosed herein are directed to a system and method for transmission and reception of modulated communications signals by suppressing cyclostationary signal features (e.g., chip rates, symbol rates, carrier frequencies) normally associated with said communications signals, such that the appearance of transmitted signals is similar to that of Gaussian distributed thermal noise and the signals themselves are less susceptible to cyclostationary detection schemes. As the system incorporates constant-envelope signal modulation, it is possible to utilize more efficient non-linear power amplifiers offering significantly greater power output compared to the linear amplifiers needed for non-constant envelope modulation. Embodiments of the inventive concepts disclosed herein are directed to a system and method for generating communication waveforms substantially free of cyclostationary features via high-entropy (high-randomness) Gaussian minimum shift keying (GMSK) modulation.

A system for generating a high entropy (HE) constant envelope signal with suppressed cyclic features is disclosed. In embodiments, the system includes an initial or primary GMSK modulator for receiving input data for transmission and generating, based on the received input data, an initial or primary GMSK modulated signal. The system includes two, three, or more secondary GMSK modulators arranged in sequence (e.g., the number of modulators may depend on the desired degree of precision). Each secondary GMSK modulator includes a transmission security (TRANSEC) module for generating pseudorandom number (PN) sequences and a spread spectrum chip operating at a chip rate. For example, the spread spectrum chip of each secondary GMSK modulator may operate at a different rate, and each TRANSEC module may generate its associated PN sequence based on the chip rate of its associated spread spectrum chip. Each secondary GMSK modulator includes a data modulator for generating a secondary GMSK modulated signal based on the associated PN sequence. The system includes a complex signal multiplier for generating an initial composite GMSK modulated signal by multiplying the primary GMSK modulated signal and the first secondary GMSK modulated signal (e.g., the GMSK modulated signal generated by the first secondary GMSK modulator of the sequence). The complex signal multiplier generates a final composite GMSK signal by sequentially multiplying this initial composite GMSK modulated signal by each subsequent secondary GMSK modulated signal generated by the next secondary GMSK modulator in the sequence. The final composite GMSK signal achieves the desired level of suppression of cyclic/cyclostationary features. The system includes a delay channel for introducing a random channel delay to the final composite GMSK signal for transmission.

In some embodiments, the chip rate is a kilohertz (kHz) chip rate, a megahertz (MHz) chip rate, or a gigahertz (GHz) chip rate.

In some embodiments, the system includes power amplifiers for amplifying the final composite GMSK signal.

In some embodiments, the power amplifier is an L-band, S-band, or C-band amplifier.

In some embodiments, the suppressed cyclic features include second-order features based on the chip rate and a double-carrier offset.

In some embodiments, the second-order features are suppressed at a conjugate cyclic autocorrelation based on a zero lag or a half-chip lag.

In some embodiments, the suppressed cyclic features include fourth-order features based on the chip rate, a multiple of the chip rate, a double-carrier offset, and a quadruple-carrier offset.

In some embodiments, the fourth-order features are suppressed at a conjugation based on a zero lag or a half-chip lag.

A method for generating a high entropy (HE) constant envelope signal with suppressed cyclic features is also disclosed. In embodiments, the method includes receiving input data via a primary (initial) Gaussian minimum shift keying (GMSK) modulator. The method includes generating an initial GMSK modulated signal based on the received input data. The method includes generating, via a sequence of two, three, or more secondary GMSK modulators, a sequence of two, three or more secondary GMSK modulated signals, each secondary GMSK modulated signal based on a unique pseudorandom number (PN) based on a unique chip rate. The method includes generating an initial composite GMSK signal by multiplying the initial GMSK modulated signal by the first secondary GMSK modulated signal of the sequence. The method includes generating a final composite GMSK signal suppressive of cyclic/cyclostationary features by sequentially multiplying the initial composite GMSK signal by each secondary GMSK modulated signal.

In some embodiments, the method includes generating a final composite GMSK signal suppressive of second-order cyclic features based on the chip rate and a double-carrier offset.

In some embodiments, the method includes generating a final composite GMSK signal suppressive of fourth-order features based on the chip rate, multiples of the chip rate, a double-carrier offset, and a quadruple-carrier offset.

In some embodiments, the method further comprises delaying the final composite GMSK signal according to a random channel delay.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
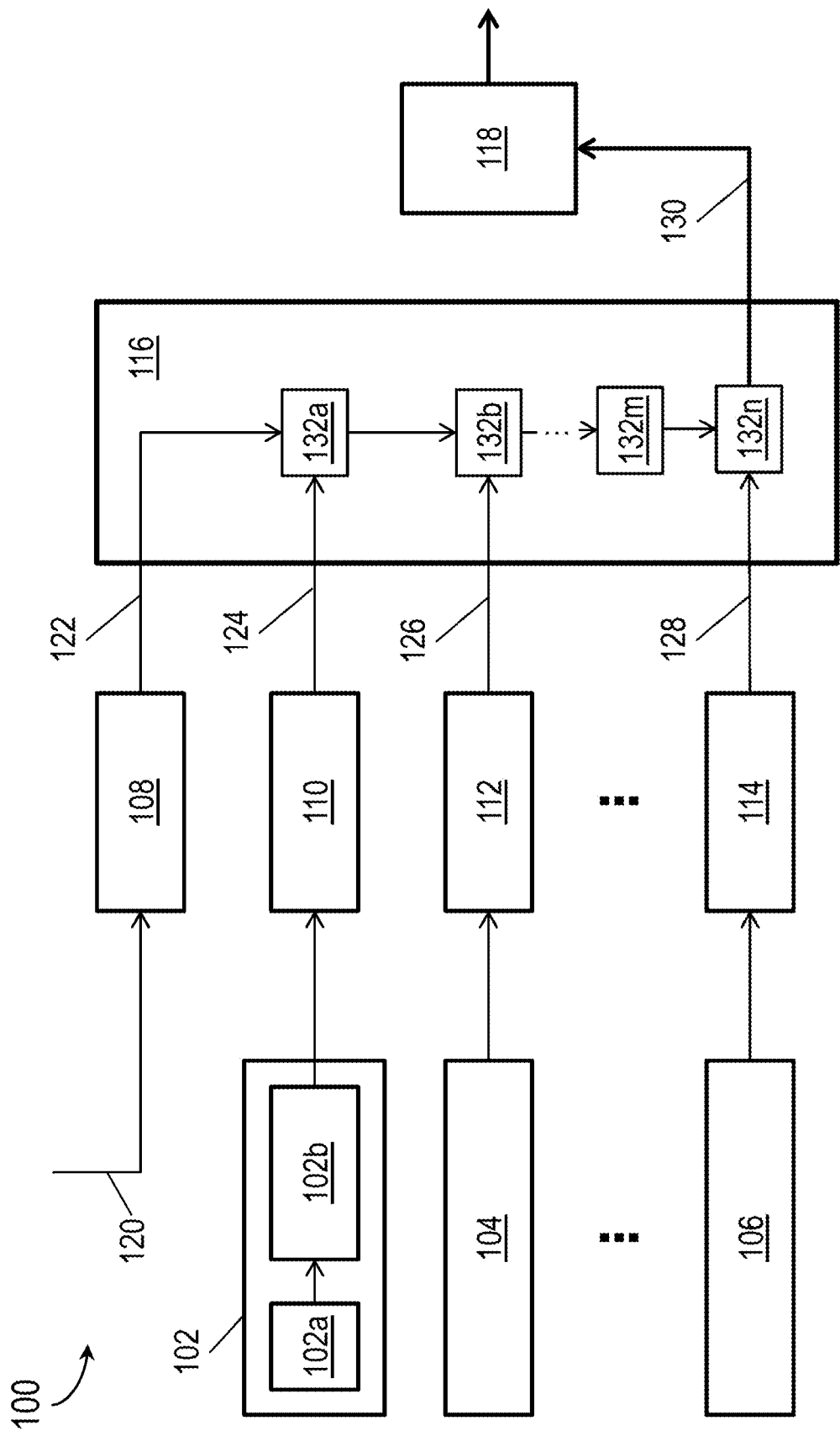
FIG. 1 is a block diagram illustrating a system for generating high-entropy Gaussian minimum shift keying (HE-GMSK) constant-envelope modulated signals, in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIG. 1—Transmission System

Broadly speaking, embodiments of the inventive concepts disclosed herein are directed to the generation of high power, difficult to jam, data communication waveforms which suppress cyclostationary features (cyclic or periodic) and thus appear to eavesdroppers or adversaries as frequency-modulated Gaussian noise. While such Gaussian noise does not have a constant envelope and generating Gaussian-like waveforms presents a difficult amplification problem, a constant-envelope signal driven non-linearly is preferred.

U.S. patent application Ser. No. 16/822,992, which has since issued as U.S. Pat. No. 10,797,920 and is herein incorporated in its entirety, discloses the generation of substantially feature-free communications signals via high-entropy (HE) continuous-phase modulation (HE-CPM). For example, in a direct-sequence spread-spectrum embodiment, a spread chip having a chip rate selects (or inverts) pseudorandom symbols based on the signal phase for one or more chips of an M-ary symbol generator. M-ary continuous phase modulation may be achieved via delta-phase mapping of the M-ary symbol to a change in the signal phase. The delta-phase-mapped output may be pulse-shaping filtered to introduce inter-symbol interference (ISI) and frequency modulated to produce an M-ary HE-CPM signal having a constant envelope and Gaussian-shaped spectrum.

However, embodiments of the inventive concepts disclosed herein may achieve similarly feature-free signals via a less complex and more bandwidth-efficient system for constant-envelope modulation than described above. Similarly, HE-GMSK modulation may provide spectral containment not found in waveforms generated by M-ary HE-CPM.

Referring to FIG. 1, a system 100 (e.g., transmitter) for generating and transmitting substantially feature-free signals via high-entropy Gaussian minimum shift keying (HE-GMSK) modulation is disclosed. The system 100 may include transmission security (TRANSEC) modules 102, 104, 106, GMSK modulators 108, 110, 112, 114, complex signal multipliers 116, and delay channel 118.

In embodiments, the GMSK modulator 108 may receive an input data stream 120 and modulate the input data stream to generate a primary GMSK modulated signal (122; e.g., initial GMSK modulated signal). For example, the primary GMSK modulated signal 122 may be a conventional GMSK modulated signal.

In embodiments, each TRANSEC module 102-106 may include a spread spectrum chip (102*a*) and pseudorandom number (PN) generator (102b). For example, the spread spectrum chip 102a may be associated with a particular chip rate (e.g., clock rate; for example, 10 MHz), and the PN generator 102b may therefore generate a PN sequence based on (e.g., clocked at) the chip rate. The GMSK modulator 110 may then generate a secondary GMSK modulated signal 124 based on the PN sequence from the PN generator 102b.

In embodiments, each additional GMSK modulator 112, 114 may similarly generate a secondary GMSK modulated signal 126, 128 based on a PN sequence generated by its TRANSEC module 104, 106, each PN sequence at a different chip rate determined by the spread spectrum chip of that TRANSEC module. For example, the TRANSEC modules 104, 106 may be associated with chip rates that are multiples or fractions of the chip rate of the spread spectrum chip 102a, e.g., if the spread spectrum chip is associated with a 10 MHz chip rate as noted above, the spread spectrum chip of the TRANSEC module 104 may be associated with a 5 MHz chip rate, the spread spectrum chip of the TRANSEC module 106 may be associated with a 2.5 MHZ chip rate, and so on. In some embodiments the primary GMSK modulated signal 122 may be associated with a chip rate, e.g., a unique chip rate different from the chip rates of the secondary GMSK modulated signals 126, 128 or a multiple thereof.

In embodiments, while the system 100 as shown by FIG. 1 includes three sets of TRANSEC modules 102-106 and GMSK modulators 110-114, embodiments of the system may incorporate two, three, or any other number of combinations of TRANSEC modules and GMSK modulators as needed or desired. Broadly speaking, additional sets of TRANSEC modules 102-106 and GMSK modulators 110-114 may be added for a more precise final HE-GMSK signal.

In embodiments, the complex signal multipliers 116 may receive the primary GMSK modulated signal 122 as well as each secondary GMSK modulated signal 124, 126, 128 and thereby construct a final composite GMSK modulated signal 130 suppressive of cyclostationary features. Broadly speaking, the more TRANSEC modules 102-106 and GMSK modulators 110-114 are incorporated into the system 100, the greater the suppression of spectral features.

In embodiments, the complex signal multipliers 116 may generate a sequence of n initial composite GMSK modulated signals 132a, ... 132m, 132n until a constant-envelope HE-GMSK modulated signal 130 (e.g., final composite GMSK modulated signal) with the desired suppression of spectral features is achieved. For example, the complex signal multipliers 116 may generate a first initial composite GMSK modulated signal 132a by multiplying the primary GMSK modulated signal 122 and the first secondary GMSK modulated signal 124.

In embodiments, the resulting first initial composite GMSK modulated signal 132a may then be multiplied by the next secondary GMSK modulated signal 126 to generate the next initial composite GMSK modulated signal 132b, which may in turn be multiplied by the next secondary GMSK modulated signal in sequence until the last secondary GMSK modulated signal 128 (e.g., from the Nth combination of TRANSEC module 106 and GMSK modulator 114) is multiplied by the last initial composite GMSK modulated signal 132n, resulting in the final HE-GMSK modulated signal 130.

In embodiments, the delay channel 118 may add a random channel delay $z^{-1}$ to the HE-GMSK modulated signal 130 for transmission (e.g., across a noisy/lossy propagation channel 134). In some embodiments, the delay channel 118 may incorporate a greater or more general digital signal processing (DSP) component including signal filters and/or power amplifiers capable of amplifying the HE-GMSK modulated signal 130 for transmission. For example, the delay channel 118 may include one or more of an L-band, S-band, and C-band amplifier for transmission at L-band (e.g., 1-2 GHz), S-band (e.g., 2-4 GHz), or C-band (e.g., 4-8 GHz) frequencies as needed or desired.

Figure 2A:
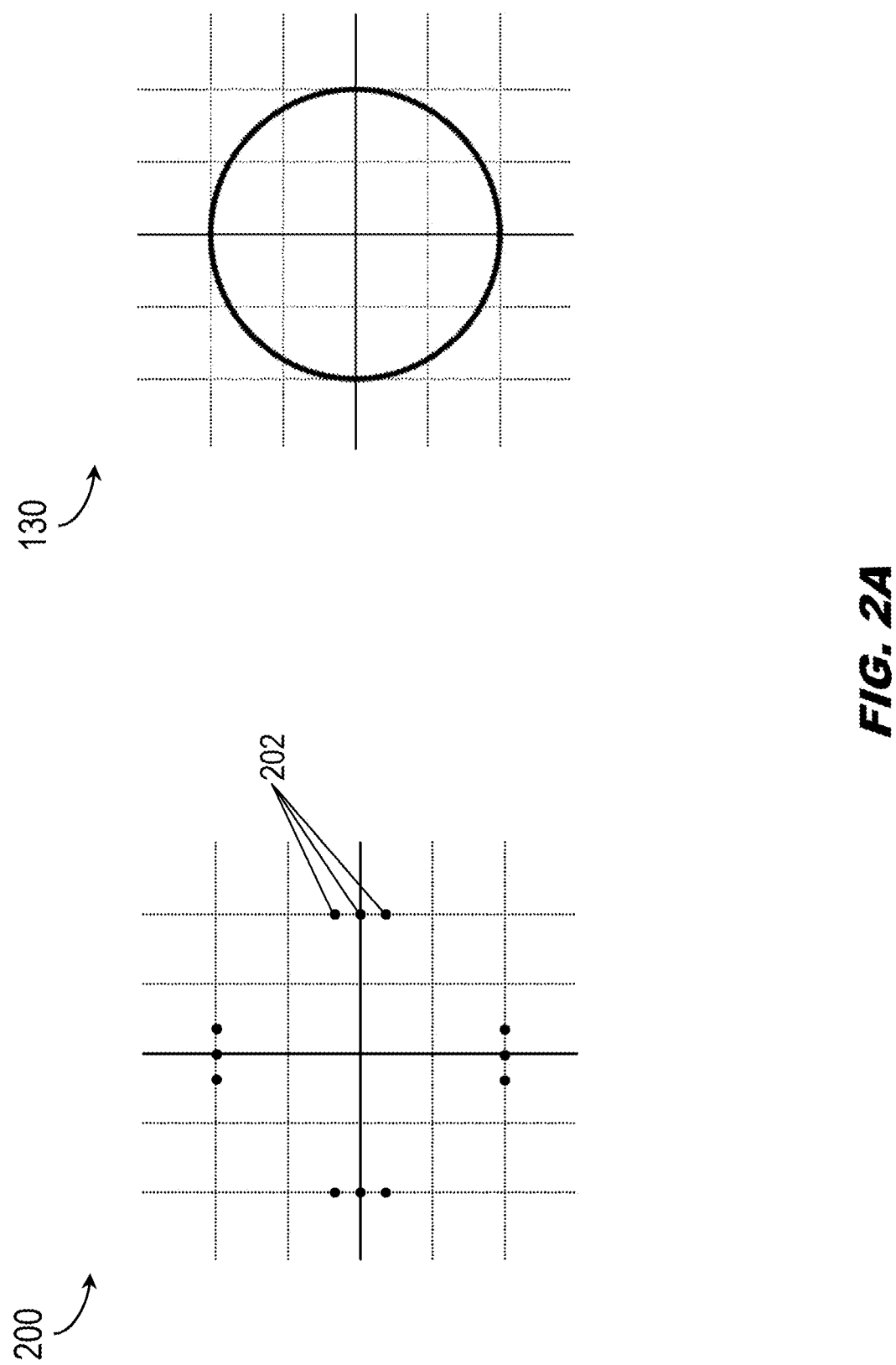
FIG. 2A illustrates modulation constellation plots of a standard GMSK modulated signals and the HE-GMSK constant-envelope modulated signals of FIG. 1.
Figure 2B:
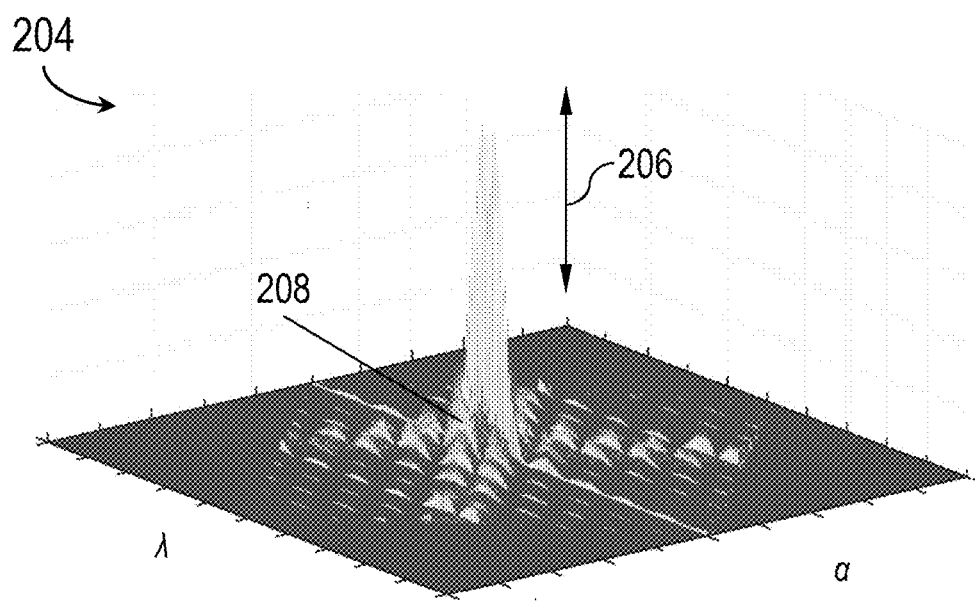
FIG. 2B is a graphical illustration of cyclostationary analysis of the HE-GMSK constant-envelope modulated signals of FIG. 1 compared to conventional binary phase shift keying (BPSK) modulated signals.
Figure 2B:
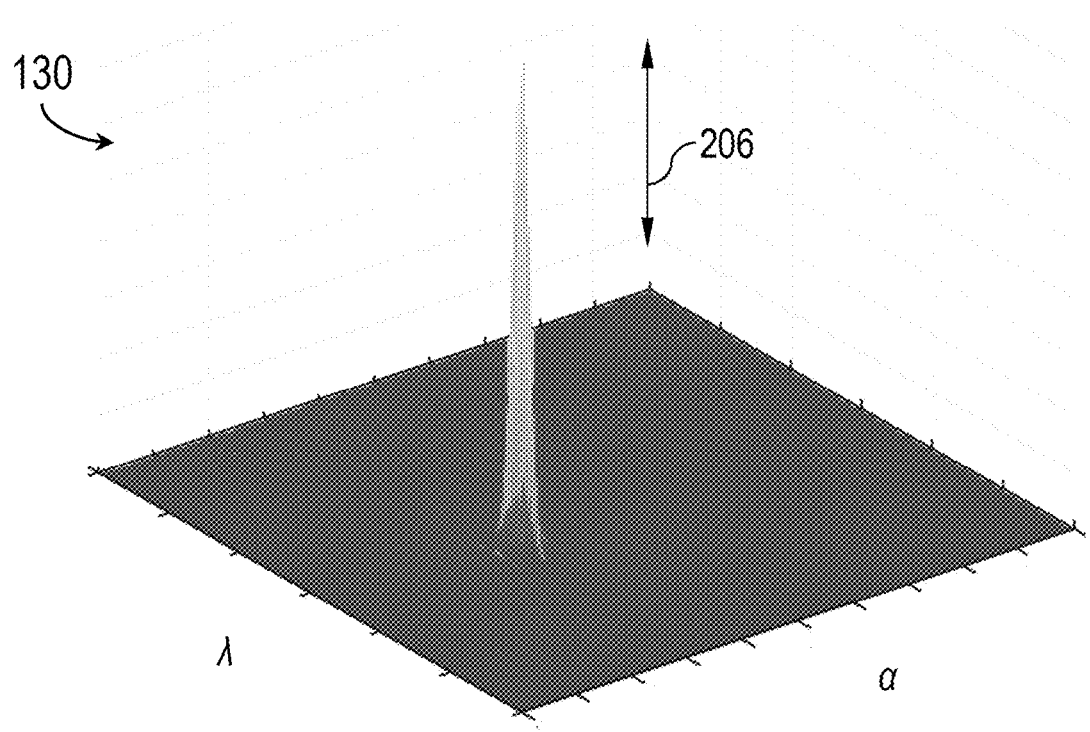
Figure 2C:
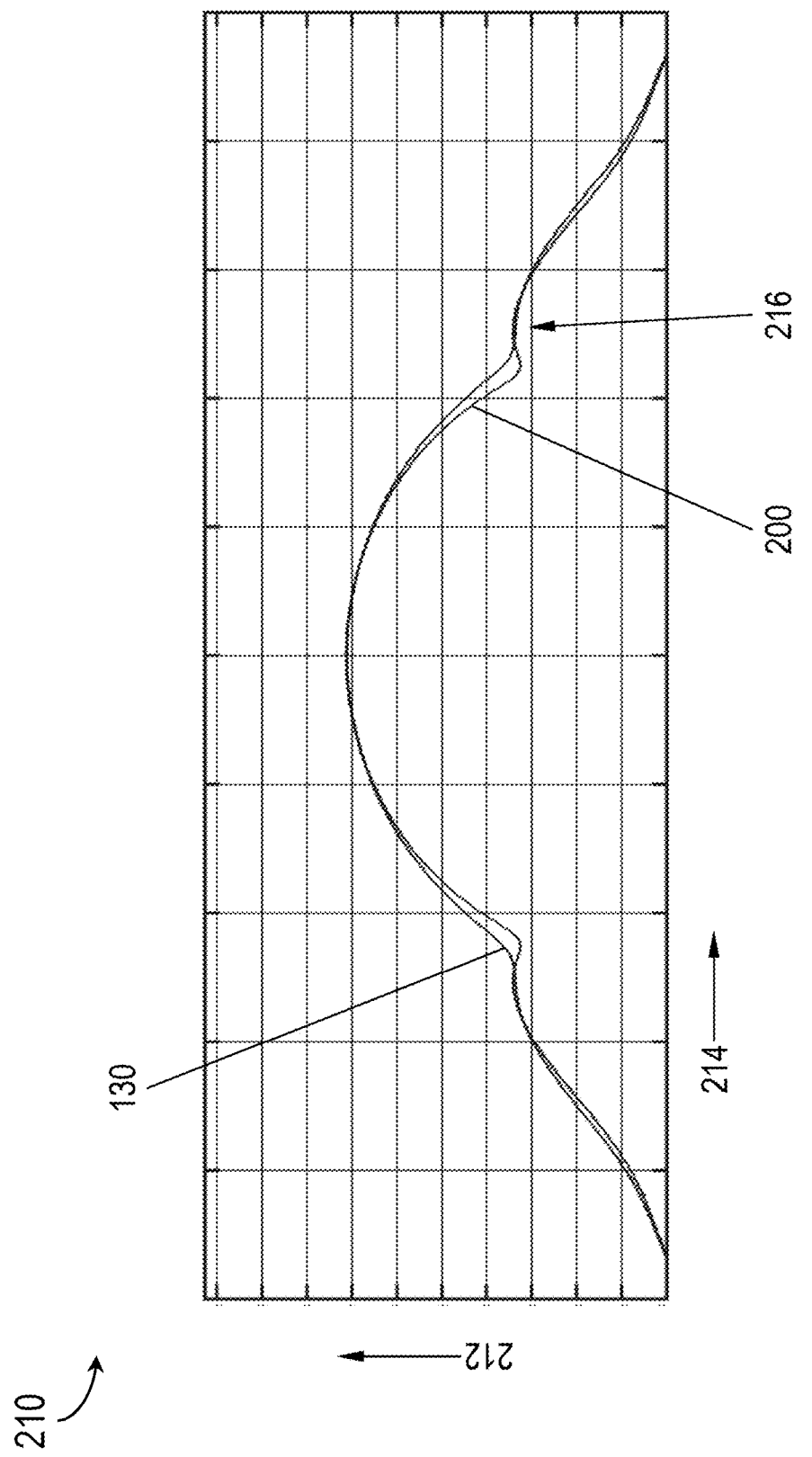
FIG. 2C is a graphical illustration of a spectral analysis of the HE-GMSK constant-envelope modulated signals of FIG. 1 compared to conventional GMSK modulated signals.

FIGS. 2A Through 2C—Signal Analysis

Referring now to FIG. 2A, constellation plots respectively depicting a conventional GMSK modulated signal 200 and the HE-GMSK modulated signal 130 generated by the system 100 of FIG. 1.

In embodiments, the constellation plot for the GMSK modulated signal 200 shows the predictable I/Q phase constellation associated with GMSK constant-envelope modulation. For example, the GMSK modulated signal 200 may arrange constellation points 202 in quadrature, while the HE-GMSK modulated signal 130 uniformly distributes constellation points, as shown by the circular constellation plot.

Referring now to FIG. 2B, spectral correlation functions respectively corresponding to a binary phase shift keying (BPSK) modulated waveform 204 and the HE-GMSK waveform 130 (e.g., at 8 symbols per second (sps)) are disclosed.

In embodiments, spectral analyses of the BPSK waveform 204 and the HE-GMSK waveform 130 both plot signal amplitude vertically (e.g., z-axis 206) against frequency (A) and cyclic frequency (a). For example, the BPSK waveform 204 may display a variety of cyclostationary features for numerous moments around the waveform proper, e.g., a second harmonic of the chip rate (208). By contrast, the HE-GMSK waveform 130 may show a near total suppression of cyclostationary features. For example, the extent to which cyclostationary features are suppressed, and the specific features suppressed from the HE-GMSK waveform 130, may depend upon the number of TRANSEC modules (FIG. 1, 102-106) and GMSK modulators (FIG. 1-110-114) incorporated into the system 100 (FIG. 1).

Referring now to FIG. 2C, a spectral comparison 210 of a conventional GMSK modulated signal 200 and the HE-GMSK waveform 130 is disclosed, plotting maximum power density 212 (e.g., dBW/Hz; magnitude-squared) against frequency 214 (MHz). For example, the HE-GMSK waveform 130 may present monotonic sidebands not found in the spectrum of the conventional GMSK modulated signal 200 (e.g., as shown by the non-monotonic sidebands 216 of the conventional GMSK spectrum).

Figure 3:
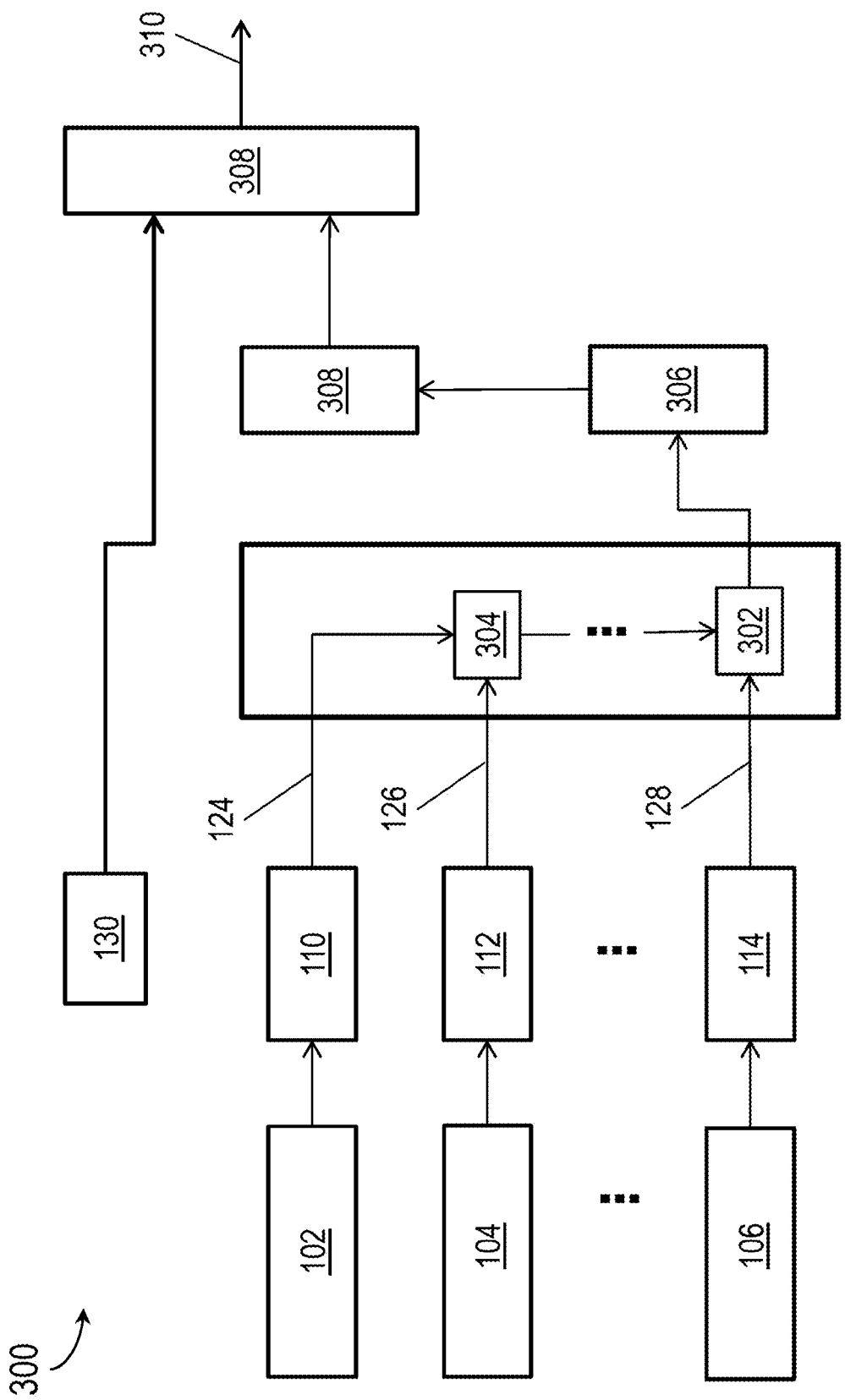
FIG. 3 is a block diagram illustrating a system for receiving the HE-GMSK constant-envelope modulated signals of FIG. 1.

FIG. 3—Receiver System

Referring to FIG. 3, a receiver 300 for receiving and/or decoding the HE-GMSK modulated signal 130 is disclosed.

In embodiments, the receiver 300 may be implemented similarly to the transmitter (100, FIG. 1), incorporating TRANSEC modules 102-106, GMSK modulators 110-114, and complex signal multipliers 116 configured identically thereto. For example, the receiver 300 may generate a final composite GMSK modulated signal 302 by first multiplying the secondary GMSK modulated signals 124, 126 to generate an initial composite GMSK modulated signal 304, and continuing to multiple the initial composite GMSK modulated signal 304 by each successive secondary GMSK modulated signal 128.

In embodiments, the secondary GMSK modulated signals 124-128 are identical to the transmitter-side secondary GMSK modulated signals (FIG. 1, 124-128) in that they are based on the same TRANSEC modules 102-106 and GMSK modulators 110-114 and therefore based on the same chip rates and PN sequences. However, the final composite GMSK modulated signal 302 may be distinct from the HE-GMSK signal 130 in that the final composite GMSK modulated signal 302 does not incorporate the primary GMSK modulated signal 122 based on the input data stream 120. Accordingly, the receiver 300 may then determine the complex conjugate (306) of the final composite GMSK modulated signal 302 and synchronize (308) the complex conjugate according to the randomized delay $z^{-1}$ added on the transmitter side (delay channel 118, FIG. 1).

In embodiments, the receiver 300 may include a second complex signal multiplier 308. For example, the second complex signal multiplier 308 may multiply the synchronized (308) complex conjugate (306) of the final composite GMSK modulated signal 302 to generate a final GMSK modulated output signal 310 indicative of the original input data stream 120. In this way, the input data stream 120 may be shared between, e.g., the transmitter and receiver systems 100, 300 via HE-GMSK waveforms 130 highly resistant to interception or detection via cyclostationary features.

FIG. 4—Method

Figure 4:
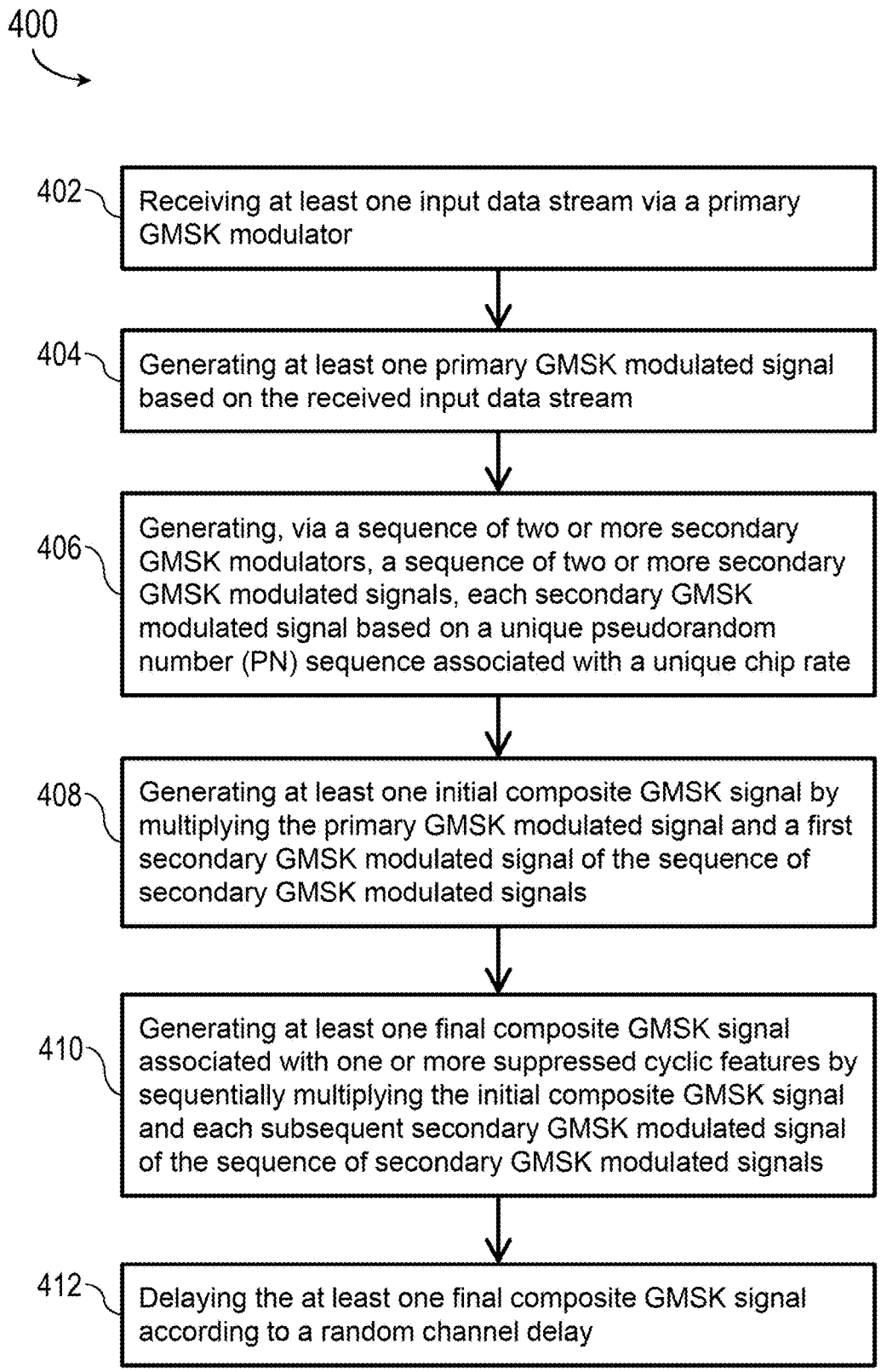
FIG. 4 is a flow diagram illustrating a method for generating HE-GMSK constant-envelope modulated signals in accordance with example embodiments of this disclosure.

Referring to FIG. 4, the method 400 may be implemented by the transmitter system 100, and may include the following steps.

At a step 402, a primary GMSK modulator receives an input data stream for transmission.

At a step 404, the primary GMSK modulator generates a primary GMSK modulated signal (e.g., conventional GMSK signal) based on the received input data stream.

At a step 406, a sequence of two or more secondary GMSK modulators generates a sequence of two or more secondary GMSK modulated signals (e.g., also conventional GMSK signals), each secondary GMSK modulated signal based on a unique pseudorandom (PN) number sequence based on a chip rate unique to each secondary GMSK modulator. For example, each secondary GMSK modulator may be fed by a PN generator and spread spectrum chip associated with a unique chip rate. However, the set of unique chip rates may be related (e.g., multiples of a chip rate).

At a step 408, an initial composite GMSK signal is generated by multiplying the primary GMSK modulated signal and the first secondary GMSK modulated signal of the sequence.

At a step 410, a final composite GMSK signal (e.g., high-entropy GMSK (HE-GMSK) signal) may be generated by sequentially multiplying the initial composite GMSK signal and each subsequent secondary GMSK modulated signal, resulting in a final composite GMSK signal suppressive of cyclic and/or cyclostationary features. For example, the HE-GMSK signal may suppress second-order features, e.g., chip rate, double-carrier offset. In some embodiments the HE-GMSK signal may suppress fourth-order features, e.g., in addition to the chip rate and double-carrier offset (e.g., multiples of the chip rate, quadruple-carrier offset).

The method 400 may include an additional step 412. At the step 412, the HE-GMSK signal is delayed according to a random channel delay.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A system for generating a high entropy (HE) constant envelope signal with suppressed cyclic features, comprising:
    a primary GMSK modulator configured to:
        receive an input data stream;
        and
        generate at least one primary Gaussian minimum shift keying (GMSK) modulated signal based on the received input data stream;
    a sequence of two or more secondary GMSK modulators, each secondary GMSK modulator comprising:
        a transmission security (TRANSEC) module configured to generate at least one pseudorandom number (PN) sequence;
        a spread spectrum chip configured for operation according to at least one chip rate, the chip rate of the secondary GMSK modulator different from the chip rate of every other secondary GMSK modulator and from a primary chip rate associated with the primary GMSK modulated signal;
        and
        a data modulator configured to generate at least one secondary GMSK modulated signal based on the at least one generated PN sequence;
    at least one complex multiplier coupled to the primary GMSK modulator and the sequence of secondary GMSK modulators, the complex multiplier configured to:
        generate at least one initial composite GMSK signal by multiplying the primary GMSK modulated signal and the first secondary GMSK modulated signal;
        and
        generate at least one final composite GMSK signal associated with one or more suppressed cyclic features by sequentially multiplying the initial composite GMSK signal by each subsequent secondary GMSK modulated signal;
    and
    a delay channel configured for delaying the at least one final composite GMSK signal according to a random channel delay.

2. The system of claim 1, wherein the at least one chip rate is selected from a group including a kilohertz (kHz) chip rate, a megahertz (MHz) chip rate, and a gigahertz (GHz) chip rate.

3. The system of claim 1, further comprising:
at least one power amplifier coupled to the delay channel and configured to amplify the at least one final composite GMSK signal.

4. The system of claim 3, wherein the power amplifier is selected from a group including an L-band amplifier, an S-band amplifier, and a C-band amplifier.

5. The system of claim 1, wherein the one or more suppressed cyclic features include one or more second-order features corresponding to the at least one chip rate and to a double-carrier offset.

6. The system of claim 5, wherein the one or more second-order features are suppressed at a conjugate cyclic autocorrelation selected from a group including a zero lag or a half-chip lag.

7. The system of claim 1, wherein the one or more suppressed cyclic features include one or more fourth-order features corresponding to one or more of:
the at least one chip rate;
at least one multiple of the at least one chip rate;
a double-carrier offset;
or
a quadruple-carrier offset.

8. The system of claim 7, wherein the one or more fourth-order features are suppressed at a conjugation selected from a group including a zero lag or a half-chip lag.

9. A method for generating a high entropy (HE) constant envelope signal with suppressed cyclic features, the method comprising:
receiving at least one input data stream via a primary Gaussian minimum shift keying (GMSK) modulator;
generating at least one primary GMSK modulated signal based on the received input data stream;
generating, via a sequence of two or more secondary GMSK modulators, a sequence of two or more secondary GMSK modulated signals, each secondary GMSK modulated signal based on a unique pseudorandom number (PN) sequence associated with a unique chip rate;
generating at least one initial composite GMSK signal by multiplying the primary GMSK modulated signal and a first secondary GMSK modulated signal of the sequence of secondary GMSK modulated signals;
and
generating at least one final composite GMSK signal associated with one or more suppressed cyclic features by sequentially multiplying the initial composite GMSK signal and each subsequent secondary GMSK modulated signal of the sequence of secondary GMSK modulated signals.

10. The method of claim 9, wherein generating at least one final composite GMSK signal associated with one or more suppressed cyclic features by sequentially multiplying the initial composite GMSK signal and each subsequent secondary GMSK modulated signal includes:
generating at least one final composite GMSK signal associated with one or more suppressed second-order features corresponding to the at least one chip rate and to a double-carrier offset.

11. The method of claim 9, wherein generating at least one final composite GMSK signal associated with one or more suppressed cyclic features by sequentially multiplying the initial composite GMSK signal and each subsequent secondary GMSK modulated signal includes:
generating at least one final composite GMSK signal associated with one or more suppressed one or more fourth-order features corresponding to one or more of:
the at least one chip rate;
at least one multiple of the chip rate;
a double-carrier offset;
or
a quadruple-carrier offset.

12. The method of claim 9, further comprising:
delaying the at least one final composite GMSK signal according to a random channel delay.

* * * * *